United States Patent [19]

Lysle

[11] 4,147,429
[45] Apr. 3, 1979

[54] APPARATUS AND PROCESS FOR PHOTOGRAPHICALLY DUPLICATING INTELLIGENCE EXISTING ON PHOTOPLASTIC FILM

[75] Inventor: Gordon Lysle, Greenlawn, N.Y.

[73] Assignee: Microx Corporation, Hauppauge, N.Y.

[21] Appl. No.: 873,926

[22] Filed: Jan. 31, 1978

[51] Int. Cl.² ............... G03B 27/04; G03B 27/16; G03B 27/78
[52] U.S. Cl. ............................ 355/133; 355/132; 355/113; 355/83
[58] Field of Search ........ 355/133, 132, 78, 113–121, 355/9, 80, 85, 97, 99; 96/27 E, 27 R

[56] References Cited

U.S. PATENT DOCUMENTS

| | | | |
|---|---|---|---|
| 1,838,312 | 12/1931 | Kanolt | 355/133 |
| 3,798,782 | 3/1974 | Lindahl | 355/132 X |
| 3,809,473 | 5/1974 | Moraw et al. | 355/9 |
| 3,944,419 | 3/1976 | Bigatel et al. | 355/133 |

Primary Examiner—L. T. Hix
Assistant Examiner—W. J. Brady
Attorney, Agent, or Firm—Watson, Leavenworth, Kelton & Taggart

[57] ABSTRACT

Process and apparatus for duplicating on microfiche the intelligence appearing on a photoplastic microfiche master by irradiating the duplicate through the master with high intensity moderately collimated light. Photoplastic film having a relatively thick thermoplastic layer is used as the master. The master and the duplicate are separated by a gap of predetermined size, which gap can be filled by air, plastic, glass or any other transparent medium. Multiple light sources isolated from one another, are used and provision is made for absorbing and dissipating some of the heat before the light reaches the master. Means are provided for assuring relatively uniform light intensity across the entire recording face and for assuring consistent irradiation of the duplicate irrespective of lamp age or line voltage variations.

41 Claims, 7 Drawing Figures

APPARATUS AND PROCESS FOR PHOTOGRAPHICALLY DUPLICATING INTELLIGENCE EXISTING ON PHOTOPLASTIC FILM

BACKGROUND AND SUMMARY

The present invention relates to apparatus and the process for making duplicate image-bearing films from a master film on which intelligence is recorded in the form of relief or deformation images. The way in which intelligence exists on prerecorded photoplastic film is so different from that which is found on more traditional microfiche and microfilm as to render the traditional processes for generating duplicate film unuseable.

In order to simplify the discussion herein, the term "mircofiche" will be used throughout. Those skilled in the art will understand, however, that the discussion applies to microfilm as well as to microfiche.

Although photoplastic film is known (see for example, the structures disclosed in U.S. Pat. Nos. 3,268,361 and 3,592,643) it is still relatively new. One of its principal advantages is that it is updateable, i.e. single microfiche frames can be exposed and developed without affecting other frames and previously recorded frames can be annotated and/or erased and rerecorded. This updateability feature makes photoplastic fiche particularly suitable for use in recording and storing active files. Prior art films, such as silver halide, on the other hand, were, in most instances, restricted to recording dead or substantially inactive files. Recording and storing live files on photoplastic microfiche permits creation of a system whereby the integrity of an organization's files is improved dramatically. A central file area can be established where original documents are immediately recorded on photoplastic microfiche and the hard copy originals permanently stored or destroyed. Thereafter, requests for files are satisfied by supplying duplicates produced on conventional microfiche, which duplicates can be disposed of when no longer needed. The photoplastic masters need never leave the central filing area.

Traditionally, duplicates have been made by projection through lenses or by contact duplication. Duplication through use of an optical system is not preferred, in part, because lenses are expensive and because of the space normally required to accommodate the light path. Additionally, optical systems have proven unsatisfactory in producing acceptable quality duplicates from photoplastic film masters. Contact duplicating from a photoplastic master also yields duplicates of inferior quality. It has been found, however, that one can produce duplicates from such a master by projecting light from the master through a small gap onto the duplicate film. One such method is disclosed in U.S. Pat. No. 3,809,473, although no apparatus is disclosed therein for implementing that process.

The primary criteria in evaluating the quality of microfiche recordings are contrast and resolution. In general, I have discovered that when employing the gap duplicating process described herein, as gap size is increased, although contrast is enhanced, resolution deteriorates. Thus, there is an apparent incompatability between quality duplicating, where both high resolution and high contrast are required, and use of the gap duplicating process.

In the gap duplicating process, at least moderately collimated light is used. I have found, however, that the degree of collimation needed depends upon the gap size. The smaller the gap, the less the requirement for a high degree of collimation. Since collimation reduces the energy available to irradiate the film, for a given required irradiation intensity, the less the light must be collimated, the lower the source luminance that is needed. Conversely, the more the light must be collimated, the lower the irradiance available from a given source.

Since the exposure time required is a function of the intensity of irradiation, the less the collimation that is needed the better. Stated another way, for a predetermined exposure time, as collimation demands increase so too must the intensity of the source.

Thus, as gap size is reduced, resolution improves and the collimation, power and/or exposure times needed are reduced. However, as gap size is reduced, so too is contrast and the ability to duplicate low signal strength intelligence.

"Signal strength" is a parameter which I presently believe is related to the contour of the deformations in the photoplastic film. Normally, it has been my experience that high signal strength intelligence does not duplicate well when a large gap is employed, but low signal strength intelligence is lost when too small a gap is employed.

I have discovered that to accommodate the above-mentioned divergent needs of the system, the gap between the emulsion face of the master and the emulsion face of the duplicate must be between about 1 and 3.5 mils. Preferably it should be between about 2.5 and 3.5 mils. To produce acceptable duplicates using a gap within these ranges, I found, the photoplastic master must carry relatively high signal strength intelligence. In order to record, with suitably high signal strength intelligence, from a wide range of originals, it has been discovered that the master fiche must have a relatively thick thermoplastic emulsion layer. Layers less than about $8\mu$ thick do not produce recordings with sufficiently high signal strength to be used with suitably small gaps. At the other extreme, the resolution of images recorded on emulsion layers of greater than about $25\mu$ is very poor. The optimum emulsion thickness appears to be between 14 and $20\mu$.

These comparatively thick emulsions are capable of recording high signal strength images of high contrast and they can be duplicated using gaps within the above-specified range.

The process and apparatus described herein take advantage of these discoveries of the interrelationships between gap size, emulsion thickness, signal strength, contrast and resolution. They are capable of producing high contrast duplicate microfiche with resolution in excess of 200 line pairs per millimeter from a wide variety of hard copy originals, and can do so despite normal line voltage fluctuations and light source deterioration. In addition, duplicates made on the disclosed apparatus have uniformly exposed frames, each of which includes identification of the location or address of the corresponding frame on the master fiche.

BRIEF DESCRIPTION OF DRAWINGS

For a thorough understanding of the nature and features of the invention, reference should be had to the following detailed description taken in conjunction with the accompanying drawings in which.

In the drawings, like reference numerals have been employed to refer to like parts throughout.

DETAILED DESCRIPTION

Figure 1:
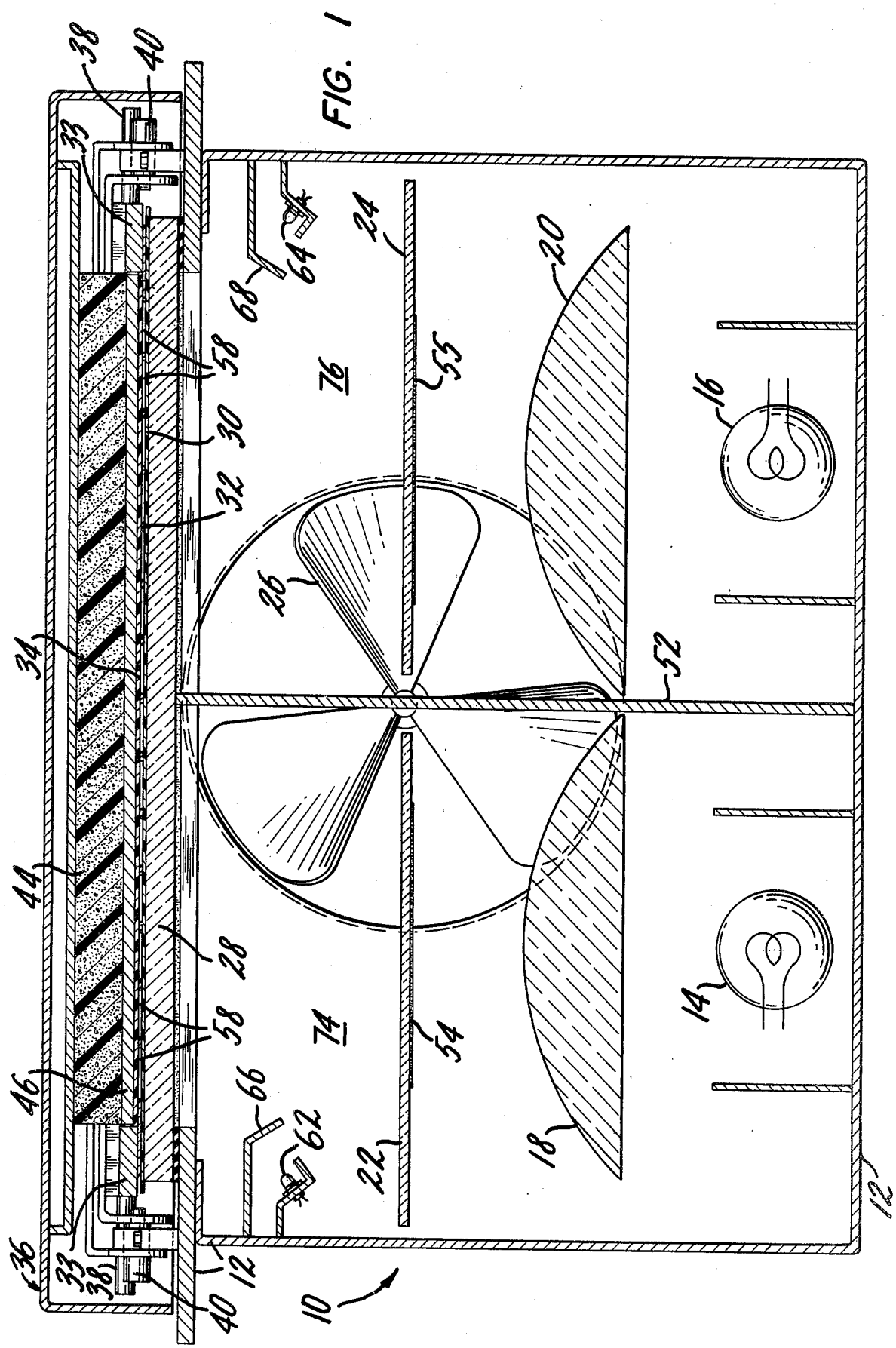
FIG. 1 is a schematic drawing of the basic components of one embodiment of the invention.

The duplicator, generally referred to by the numeral 10, has an enclosure 12, two light sources 14 and 16, two condensing lenses 18 and 20, and two heat glasses 22 and 24. A fan 26 is provided at the rear of enclosure 12 for cooling purposes.

As can be seen in the drawing, the embodiment depicted is comprised of two sections; a left duplicating section and a right duplicating section. The components in one section are identical with those in the other.

In employing the process of the present invention, high intensity light is required. Although an arc lamp could be used as a light source, such lamps are quite expensive, require heavy power supplies and are unreliable in starting. In order to avoid these and other problems associated with arc lamps, I have employed two high intensity incandescent bulbs 14 and 16. It has been found that BCK lamps (e.g. GTE Sylvania TF 7460-0024) serve quite well.

In the embodiment of the drawings, the light emitted by lamp 14 passes up through condenser 18 and then through heat glass 22. After passing through glass 22 it goes through platen 28, the photoplastic master fiche 30 resting thereon, thence up through the metal spacer grid 32 which covers and separates the master fiche from the duplicate and finally onto the duplicate fiche 34. Similarly, in the right section the light from lamp 16 passes through condenser 20, heat glass 24 and thence through platen 28, master 30, the openings on grid 32 and onto duplicate 34.

Figure 6:
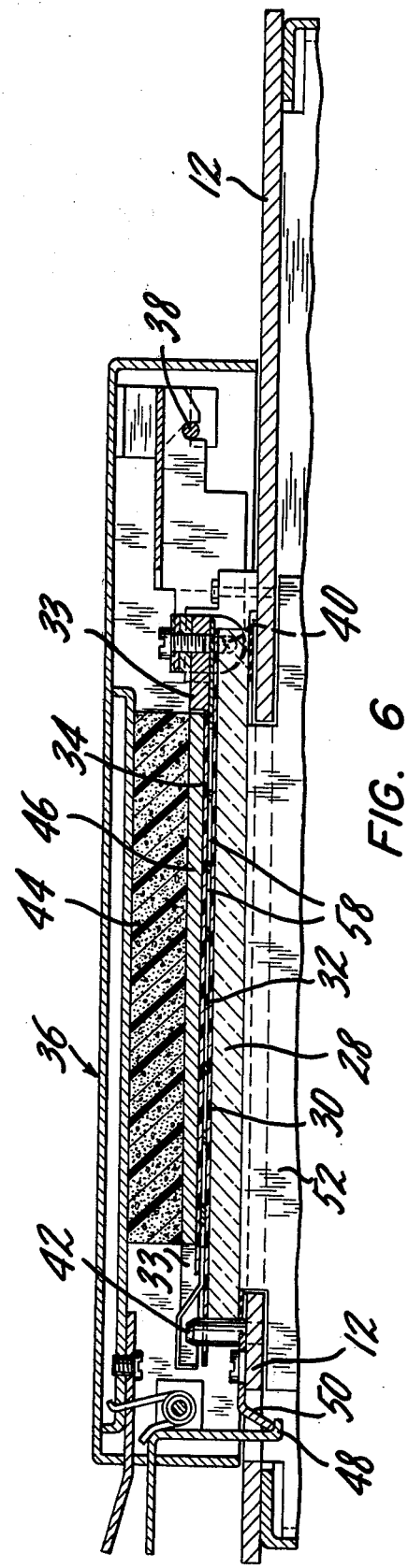
FIG. 6 is a right side sectional view of the lid area and parts lying directly beneath the lid.

When a duplicate is being made, the entire assembly of glass platen 28, master fiche 30, grid 32 and duplicate film 34 is covered by lid 36. As can best be seen in FIG. 6, lid 36 is hinged around pivot 38 and grid mount 33 to which grid 32 is secured is hinged around its own pivot 40. Lid pivot 38 is located outboard of grid pivot 40 so that when lid 36 is open in its upright position, grid 32 can be opened without there being any interference between grid and lid.

Means are also provided for properly locating master fiche 30 and duplicate fiche 34 relative to one another and relative to platen 28 and grid 32. The master fiche, which is placed on platen 28 emulsion up, is provided with locating holes which cooperate with locating pins 42. Grid mount 33 provides a three sided rececess to receive and properly locate the duplicate fiche, which is placed thereon emulsion down. In the standard microfiche format the exposure region contains 98 frames arranged in 7 rows and 14 columns. When master 30 is positioned with locating pins 42 in the locating holes and grid 32 lies on the master, each frame opening 58 in the grid is coincident with one frame on the master and the grid support strips lie directly over unexposed frame borders.

It is important that a uniform gap between master and duplicate be maintained across the entire fiche. This is achieved, in part, by emulsion to emulsion juxtaposition of master and duplicate and by use of a grid having closely controlled thickness. In order to make sure that the entire bottom face of the grid is flat against the emulsion face of the master fiche and that the emulsion face of the duplicate fiche is flat against the top face of the grid, a thick pad of deformable foam 44 is cemented to the inside of lid 36. To prevent the duplicate fiche from being forced into individual open frame areas 58 in the grid, a metal plate 46 is cemented to the bottom face of foam pad 44. During duplicating, lid 36 is held closed by a latch consisting of lip 48 at the end of lid 36 which engages catch 50 on housing 12. When lid 36 is closed and lip 48 engages catch 50, foam pad 44 is compressed and substantially uniform pressure is applied by plate 46 against the entire back face of duplicate fiche 34. Intimate contact between the duplicate fiche and the top face of grid 32 and between the bottom face of grid 32 and master fiche 30 is thereby assured. Metal plate 46 prevents foam pad 44 from depressing unsupported regions 58 of duplicate fiche 34 below the plane of the top face of grid 32. In each frame area, therefore, the gap between the emulsion faces is substantially the same as the thickness of the grid.

In the embodiment shown, the gaps between juxtaposed frames are filled with air. They may, however, be filled with any transparent medium, for example, plastic or glass. Illustratively, a continuous clear plastic sheet could be used as a separator instead of grid 32, or frame areas 58 of grid 32 could be filled with clear plastic. If a medium other than air intervenes between juxtaposed frames, the gap size must be modified to take this into account. The gap size may be determined by application of the following formula:

$$G_x/G_a = n_x/n_a$$

where
 $G_x$ is the gap distance to be determined
 $G_a$ is the gap distance when air intervenes
 $n_x$ is the index of refraction of the intervening medium
 $n_a$ is the index of refraction of air.

For example, if the ratio of the index of refraction of the plastic to that of air were 1.6:1, the gap should be between 1.6 and 5.6 mils., and preferably between 4.0 and 4.8 mils.

If one were to decide upon use of a clear plastic separator, it could be incorporated as part of the photoplastic fiche envelope and serve as a protector as well. Alternatively, both duplicate and master fiches could be placed with their emulsion sides facing in the same direction so that the support substrate of one or the other would function as the separator.

Although use of a solid separator offers certain advantages, it does so at some expense. Adding an additional solid separator inevitably introduces unwanted optical "noise." It also involves making physical contact with the emulsion face of the photoplastic film in frame areas thereof and applying pressure thereto to improve optical contact with the film faces. This tends to distort the photoplastic film deformations and scratch the film.

While use of the film support substrate as the separator avoids introducing refracting surfaces and other sources of noise not already present, it still involves making physical contact with and applying pressure to photoplastic film frame areas and the disadvantages attendant thereupon.

As pointed out above, two light sources, lamps 14 and 16, are used. Each lamp irradiates one zone of 49 frames in the exposure region, or one half of the fiche. By using two or more sources the uniformity of irradiance is significantly improved over that which would result were only a single source employed. One lamp, 14, exposes that exposure zone which lies immediately above chamber 74, and the second lamp, 16, exposes the other zone, that which lies above chamber 76.

In gap duplicating, it is essential that each given area of the master and duplicate be irradiated by only one light source (either a single lamp or several lamps closely clustered). If two or more physically separated sources were to expose one area of the duplicate, "ghosting," the recording of multiple, slightly displaced, images, would result. In order to avoid the "ghosting" effect and ensure relatively uniform intensity across each microfiche half, the light emitted by one source is isolated from that emanating from the others. In the embodiment of the drawings, this isolation is achieved by use of dividing wall 52 which extends from the bottom of the enclosure up to the underside of glass platen 28 and separates chamber 74 from chamber 76. Nevertheless, because dividing wall 52 does not meet the underside of duplicate fiche 34, there remains a small band of light emission overlap. The band of overlap, however, is very narrow and the apparatus has been designed so the overlap falls under and entirely within the confines of grid band 80.

As mentioned previously, in order to produce acceptable duplicates on vesicular or diazo film, substantial amounts of energy in the near ultraviolet wavelength range must be transmitted through the master fiche onto the duplicate fiche. Incandescent lamps capable of emitting sufficient amounts of energy in the form of near ultraviolet rays, also emit large amounts of infrared radiation. Although light in the infrared range serves no useful function in duplicating, it carries a substantial amount of heat energy. Since heat build up is to be avoided, particularly when using vesicular duplicates which develop upon application of heat, heat glasses 22 and 24 are designed to absorb infrared radiation. The heat absorbed by glasses 22 and 24 is dissipated by the flow of air that results from use of fan 26.

Although at the mouth of each chamber the light source subtends a relatively small angle, since light intensity vaies approximately as the fourth power of the cosine of the half-angle subtended, the angle is sufficiently large so that the light intensity at each edge of a fiche half is significantly less than that at its center. In order to ameliorate this lack of uniform illumination and eliminate the hot spot effect at the center of each fiche half, a thin film of chromium is vacuum deposited on one face of each heat absorbing glass, thereby forming a low density filter. Glass 24 has low density filter 55 deposited on it and glass 22 has filter 54 deposited on it. The light reaching the center of each fiche half must first pass through a filter but the light reaching the perimeter does not.

Figure 2:
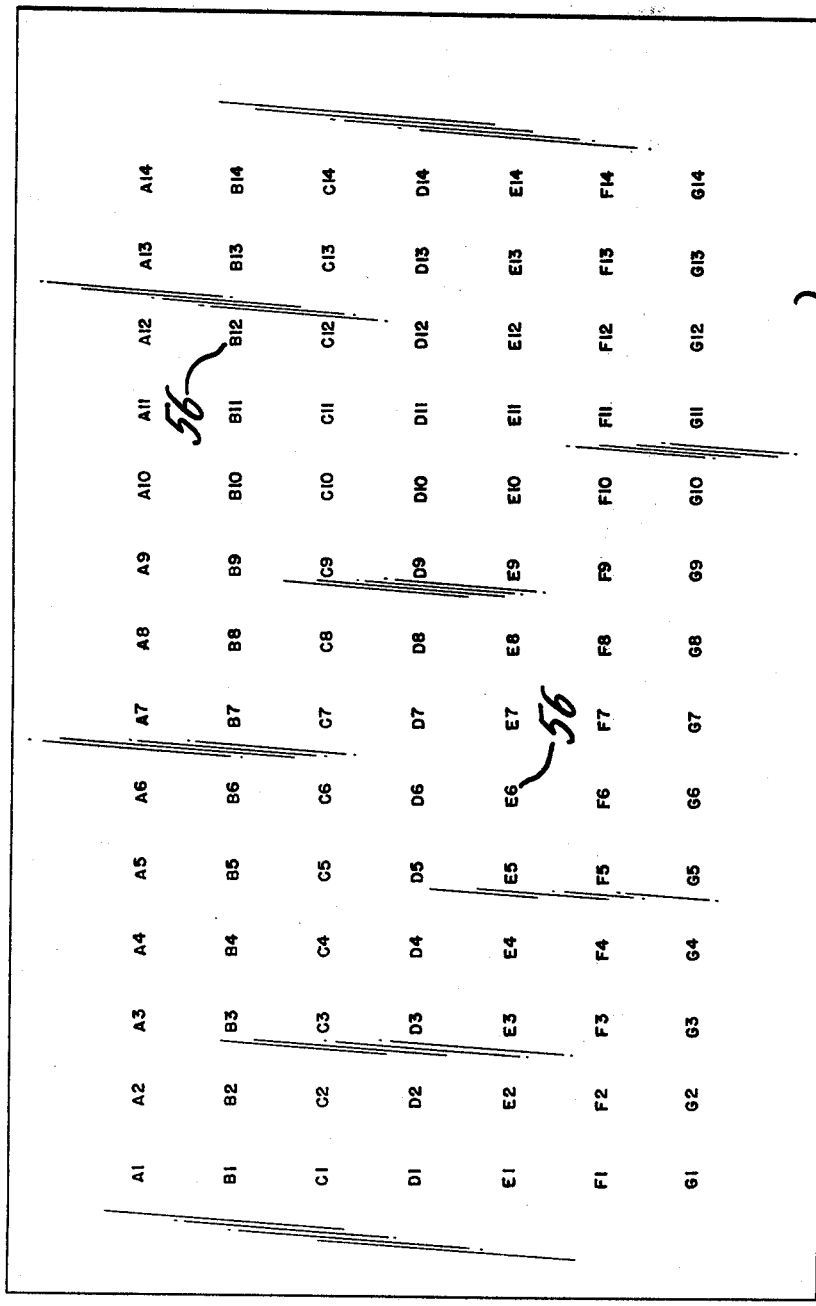
FIG. 2 shows the glass platen upon which the master fiche rests during the duplicating process.
Figure 3:
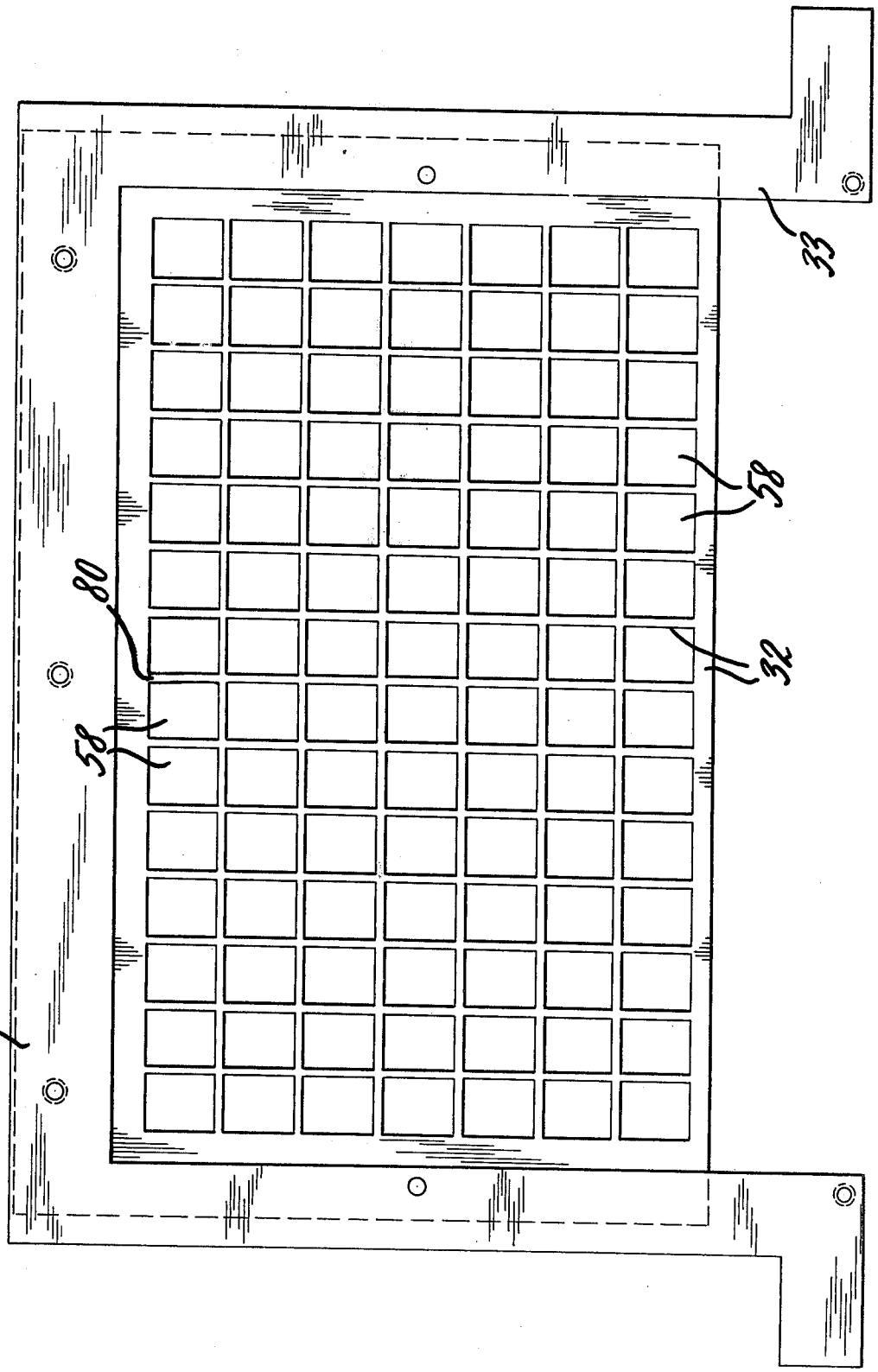
FIG. 3 shows the overlay grid, which intervenes between master and duplicate, and the grid mount.
Figure 4:
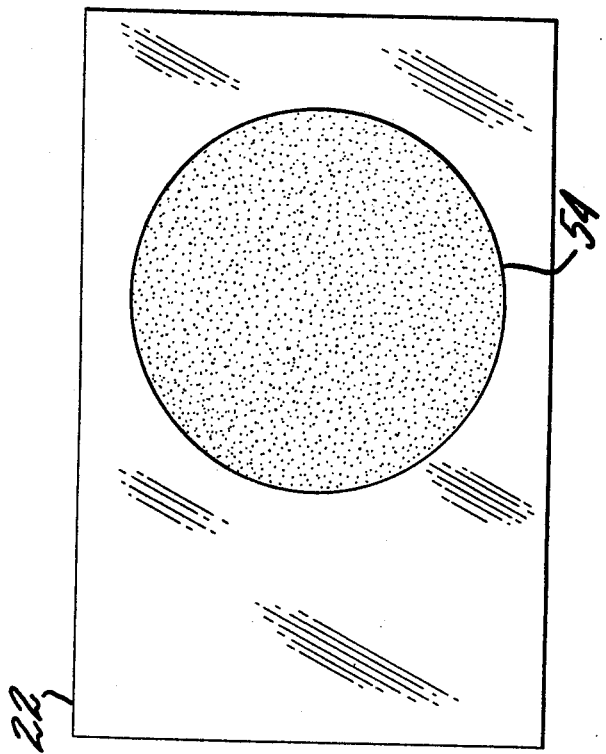
FIG. 4 shows one heat absorbing glass which intervenes between one light source and the master fiche.

Frequently, hard copies will be made, for working purposes, from a single frame of the duplicate fiche. Thereafter, it may be desireable to locate the frame on either the master or the duplicate fiche from which the hard copy came. In order to facilitate locating the proper frame, means are provided for putting an address on the duplicate fiche and on the hard copy. As can best be seen in FIG. 2, glass platen 28 is provided with alphanumeric addresses located so that when a duplicate is produced, the address of the fiche frame will appear in the upper left hand corner thereof. The alpha-numeric figures on platen 28 are of chromium deposited on the top side of the platen. Since the adddress is on the duplicate film, when a hard copy is made from it, the address will appear on the hard copy.

It has been found that the exposure time required to produce an acceptable duplicate on the disclosed apparatus tends to be very sensitive to fluctuations in light intensity. Light intensity in turn, is a function of the voltage applied to the lamps. The required exposure time, therefore, varies inversely as a function of the voltage. This voltage dependency is sufficiently sensitive that the normal fluctuations found in line voltages, if applied to the lamps, all else being held constant, would have a substantial effect on the quality of the duplicate. In addition, it has been found that, even with constant voltage applied, the exposure time required for an optimum duplicate varies as the lamp ages. Moreover, since incandescent lamps tend to age at different rates, if the same voltage were always applied to both lamps in the duplicator, the irradiation of one half of the fiche would frequently differ from the irradiation of the other half.

Figure 5A:
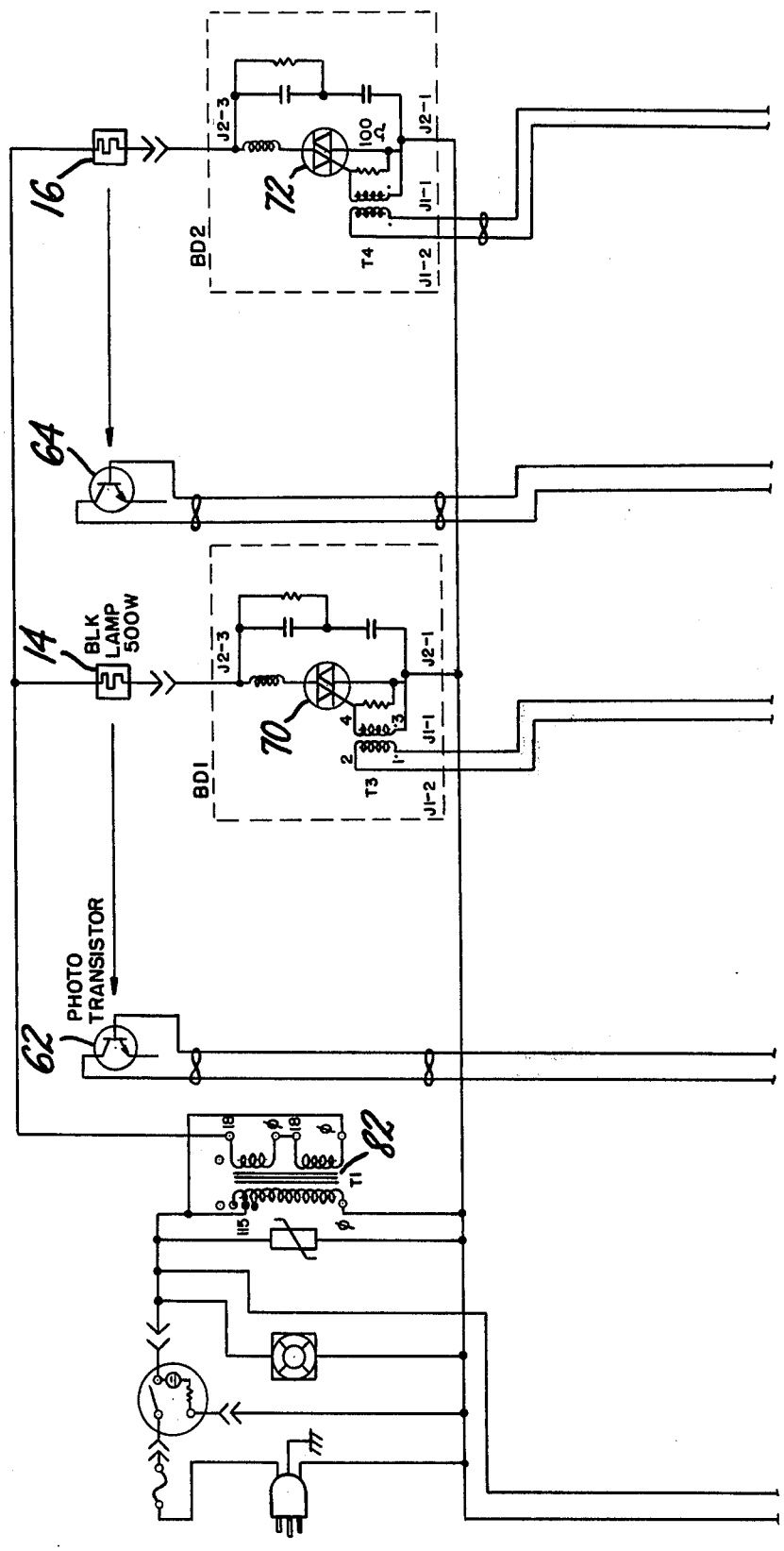
FIGS. 5a and 5b is a schematic diagram of the power supply control circuit.
Figure 5B:
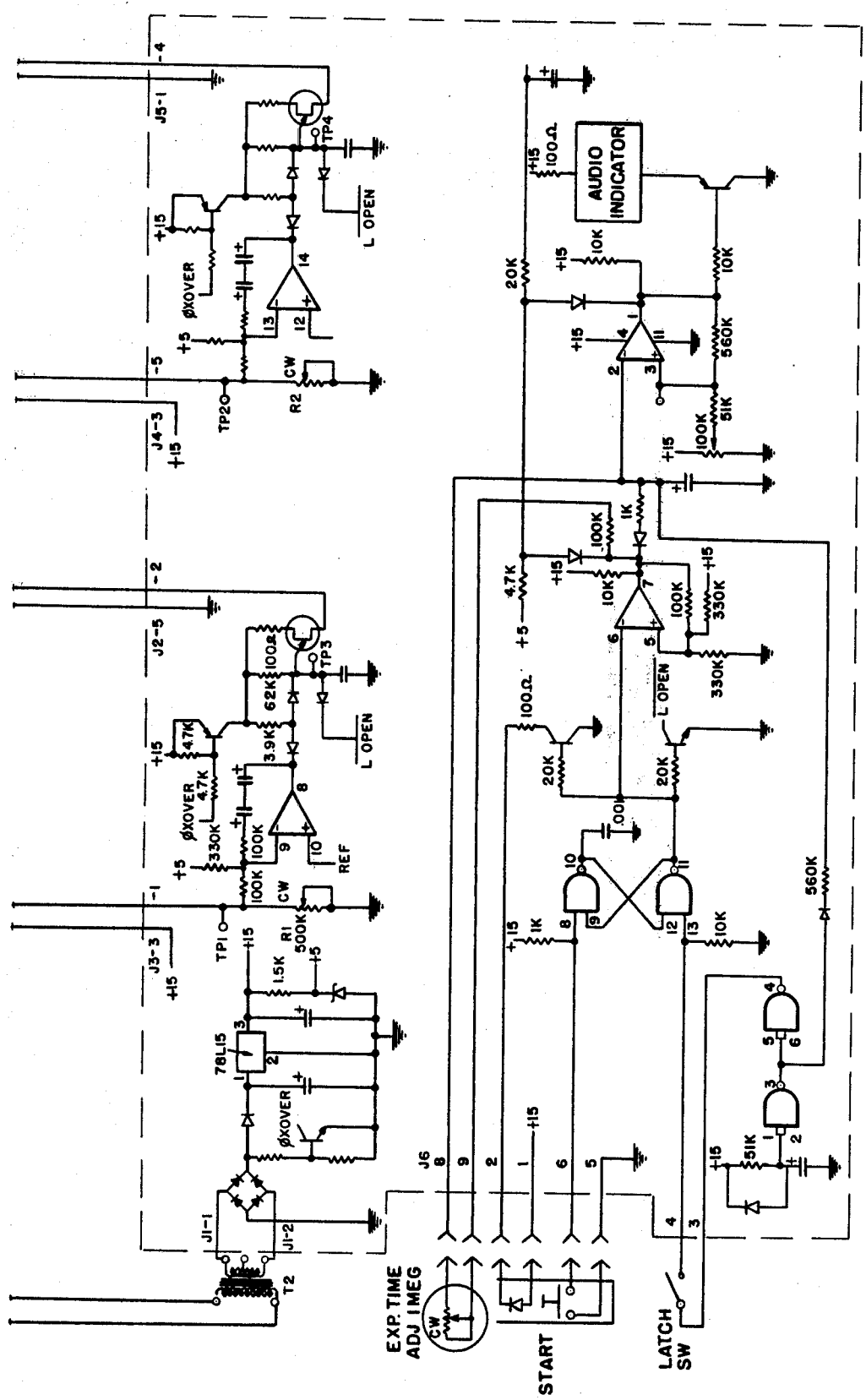

To overcome these difficulties, I have provided a control circuit, shown in FIGS. 5a and 5b which assures uniform light output over the entire fiche and assures that said light output is maintained at a predetermined level irrespective of line voltage fluctuations or lamp age and efficiency.

Uniform irradiation of the master fiche is achieved by making the voltage applied to each lamp responsive to the amount of light emitted by that lamp. Light chambers 74 and 76 are, therefore, provided with light sensors 62 and 64 respectively. A light shield or hood 66 and 68 is provided for each sensor so that the sensor is not "fooled" by light reflections from the surfaces above.

Generally, through the use of transformer 82, the control circuit steps up the incoming line voltage to about 156 volts. The voltage is then reduced to the desired level by use of triacs 70 and 72. Each triac is triggered at a point in the cycle to produce a voltage output to the lamp such that the lamp emits the predetermined amount of light. The triggering of triac 70 is controlled by sensor 62 and of triac 72 by sensor 64. Once initially adjusted, within reasonable limits, the circuit of FIG. 5 will maintain a constant and uniform amount of light across the entire face of the fiche, irrespective of line voltage fluctuations and lamp efficiency. It has been found that a typical exposure time, using vesicular film in the disclosed apparatus, can be kept constant at about 8 seconds.

Although in the embodiment shown herein two light sources have been employed, the process can be practiced using three or more. The greater the number of sources, the less need there is for hot-spot filters.

Having described my invention, what I claim as new and desire to protect by Letters Patent is the novel subject matter defined in the following claims:

1. The process of producing a microfiche duplicate comprising
   (a) placing on support means a microfiche master having a front and a back face, which front face carries intelligence in the form of deformation images in a deformation image layer of between about 8 and 25μ thick;
(b) positioning said duplicate in substantially parallel relationship with said master;
(c) separating said master and said duplicate by a gap in mils of from $1[n_x/n_a]$ to $3.5[n_x/n_a]$ where $n_a$ is the index of refraction of air and $n_x$ is the index of refraction of the medium in said gap;
(d) predetermining the time during which said duplicate is to be exposed;
(e) exposing said duplicate for said predetermined period of time by passing light from at least two sources through said master, in one of said faces, and out said other face, thence across said gap and onto said duplicate; and
(f) controlling the intensity of said light so it is maintained at a predetermined level.

2. The process of claim 1 wherein said gap is between $2.5[n_x/n_a]$ and $3.0[n_x/n_a]$.

3. The process of claim 1 wherein said deformation image layer is between 14 and 20μ.

4. The process of claim 1 wherein said sources are of high intensity light and wherein said light passing from said master to said duplicator is at least moderately collimated.

5. The process of claim 4 wherein each of said light sources exposes a different portion of said duplicate.

6. The process of claim 3 wherein the intensity of light reaching said master is substantially uniform across the entire exposure area of the front face of said master.

7. The process of claim 6 wherein said uniformity is achieved by interposing low density filters between said sources and said master.

8. The process of claim 6 wherein each of said light souces exposes a different portion of said duplicate and wherein said uniformity is achieved by interposing a low density filter between each of said sources and the portion of said duplicate exposed thereby.

9. The process of claim 4 wherein at least some of the heat energy carried by said light is prevented from reaching said master.

10. The process of claim 5 wherein the voltage applied to each light source is made responsive to the intensity of light reaching said master in the area exposed by said source.

11. Apparatus for producing, on light sensitive films, duplicates of master films having deformable layers of between 8 and 25μ thick whereon intelligence has been recorded in the form of deformation images, comprising
(a) master film support means;
(b) duplicate film support means;
(c) means for spacing said duplicate from said master at a predetermined gap distance in mils of from $1[n_x/n_a]$ to $3.5[n_x/n_a]$ where $n_a$ is the index of refraction of air and $n_x$ is the index of refraction of the medium in said gap;
(d) means for positioning said duplicate film parallel to and in predetermined transverse relation to said master;
(e) at least two sources of light;
(f) means for directing the radiation from said sources through said master, across said gap and thence to said duplicate film; and
(g) means for predetermining and controlling the time period during which said duplicate is exposed to said light.

12. The apparatus of claim 11 wherein said duplicate support means, intervenes between said master and said duplicate and contains at least one light transmissive area therein.

13. The apparatus of claim 11 wherein said predetermined gap distance is between $2.5[n_x/n_a]$ and $3.0[n_x/n_a]$.

14. The apparatus of claim 11 wherein said duplicate support means also serves as said spacing and said positioning means.

15. The apparatus of claim 12 further comprising means for collimating the light from said light sources.

16. The apparatus of claim 12 further comprising means for controlling said light so its intensity at said master is substantially uniform across the entire exposure area of said master.

17. The apparatus of claim 16 wherein said light controlling means is comprised of low density light filter means interposed between said light sources and said master.

18. The apparatus of claim 11 further comprising means for interrupting the transmission of at least some of the heat energy carried by said light and dissipating the same before it reaches said master.

19. The apparatus of claim 18 wherein said heat interrupting means is comprised of heat absorbing glass interposed between said light sources and said master.

20. The apparatus of claim 19 wherein said heat absorbing glass includes low density light filter means.

21. Apparatus for producing, on light sensitive film, a duplicate from a master microfiche having a deformable layer thereon of between 8 and 25μ thick with intelligence recorded thereon in the form of deformation images in preselected frame areas of an exposure region thereof, comprising
(a) first support means for said master;
(b) second support means for said duplicate;
(c) means adapted to space said duplicate from said master at a predetermined gap distance in mils of from $1[n_x/n_a]$ to $3.5[n_x/n_a]$ where $n_a$ is the index of refraction of air and $n_x$ is the index of refraction of the medium in said gap;
(d) means for positioning said duplicate parallel to and in predetermined transverse relation to said master;
(e) at least two sources of light each positioned to direct light to different zones within the exposure region of said master;
(f) means for confining the radiation from each of said sources so that the light therefrom passes through only one of said zones of said master, across said gap and onto said duplicate;
(g) means for predetermining and controlling the time during which said duplicate is exposed to said light; and
(h) means for controlling the light reaching said master from each source so that its intensity across its exposure zone on said master is substantially uniform.

22. The apparatus of claim 21 wherein said second support means is comprised of a grid of predetermined pattern of light-transmissive and opaque areas therein and is designed to be interposed between said master and said duplicate during duplicating.

23. The apparatus of claim 22 wherein said grid pattern of light-transmissive areas corresponds to the pattern of frame areas on said master and wherein said grid is positioned so that said light-transmissive areas are juxtaposed to said frame areas on said master.

24. The apparatus of claim 23 wherein said light-transmissive areas are of a transparent plastic material.

25. The apparatus of claim 21 wherein said second support means is comprised of a solid transparent material of predetermined thickness which serves also as said spacing means.

26. The apparatus of claim 25 wherein said solid transparent material is a sheet of plastic.

27. The apparatus of claim 25 wherein said solid transparent material is glass.

28. The apparatus of claim 26 wherein said plastic sheet is attached to said master fiche and serves as a cover and protector therefor.

29. The apparatus of claim 21 wherein said master functions as said second support means and wherein said duplicate fiche contains a transparent support substrate and wherein said spacing means is the support substrate of said duplicate.

30. The apparatus of claim 21 wherein said master functions as said second support means, wherein said master fiche contains a transparent support substrate and wherein said support substrate is the spacing means.

31. The apparatus of claim 23 wherein said light controlling means maintain a substantially uniform light intensity across the entire exposure region of said master.

32. The apparatus of claim 23 wherein said light controlling means is comprised of low density light filters.

33. The apparatus of claim 23 further comprising means for interrupting the transmission of at least some of the heat energy carried by the light from said sources and dissipating the same before it reaches said master.

34. The apparatus of claim 33 wherein said heat interrupting means are comprised of heat absorbing glass interposed between said light sources and said master.

35. The apparatus of claim 34 wherein said light controlling means are low density filters.

36. The apparatus of claim 21 wherein said light sources are electrically powered, and further comprising means for regulating the electrical voltage applied to each of said sources in response to the intensity of said light reaching said master from said source.

37. Apparatus for producing, on light sensitive film, a duplicate from a master microfiche having a deformable layer thereon of between 8 and 25$\mu$ thick with intelligence recorded thereon in the form of deformation images in preselected frame areas of an exposure region thereof, comprising
(a) first support means for said master;
(b) second support means for said duplicate;
(c) means adapted to space said duplicate from said master at a predetermined gap distance in mils of from $1[n_x/n_a]$ to $3.5[n_x/n_a]$ where $n_a$ is the index of refraction of air and $n_x$ is the index of refraction of the medium in said gap;
(d) means for positioning said duplicate parallel to and in predetermined transverse relation to said master;
(e) at least two light chambers each in optical communication with said master support means;
(f) at least one light source in each of said chambers, the light path from each of said sources passing through said first support means, through said master, through said second support means and onto said duplicate;
(g) means for collimating the light from each of said sources; and
(h) means for controlling the time during which said duplicate is exposed to light from said chambers.

38. The apparatus of claim 37 wherein each of said chambers is optically isolated from each other chamber.

39. The apparatus of claim 35 wherein said second support means is comprised of a grid of predetermined pattern of light-transmissive and opaque areas therein and is designed to be interposed beween said master and said duplicate during duplicating.

40. The apparatus of claim 39 wherein overlap of light from more than one of said chambers occurs only in areas of said master between said frames and wherein the light in said overlap areas is prevented from reaching said duplicate by said opaque areas of said grid.

41. The apparatus of claim 37 wherein said master and said duplicate each has an emulsion face and wherein said master and duplicate are supported by said support means with said emulsion faces facing each other.

* * * * *